United States Patent
Marcu et al.

(10) Patent No.: US 9,495,116 B2
(45) Date of Patent: Nov. 15, 2016

(54) STORAGE DEVICE COORDINATOR AND A HOST DEVICE THAT INCLUDES THE SAME

(75) Inventors: Alon Marcu, Tel-Mond (IL); Alain Nochimowski, Tel Aviv (IL); Micha Rave, Herzliya (IL); Amir Lehr, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 1595 days.

(21) Appl. No.: 11/964,060

(22) Filed: Dec. 26, 2007

(65) Prior Publication Data

US 2009/0172333 A1 Jul. 2, 2009

(51) Int. Cl.
*G06F 12/00* (2006.01)
*G06F 3/06* (2006.01)

(52) U.S. Cl.
CPC ........... *G06F 3/0659* (2013.01); *G06F 3/0611* (2013.01); *G06F 3/0613* (2013.01); *G06F 3/0688* (2013.01)

(58) Field of Classification Search
CPC .. G06F 3/0659; G06F 3/0611; G06F 3/0613; G06F 3/0688
USPC ........................................................ 711/112
See application file for complete search history.

(56) References Cited

U.S. PATENT DOCUMENTS

| | | | |
|---|---|---|---|
| 5,900,007 A * | 5/1999 | Nunnelley et al. | 711/4 |
| 6,757,800 B1 | 6/2004 | Estakhri et al. | |
| 6,813,678 B1 | 11/2004 | Sinclair et al. | |
| 7,073,010 B2 | 7/2006 | Chen et al. | |
| 7,076,690 B1 * | 7/2006 | Todd et al. | 714/13 |
| 7,155,562 B2 | 12/2006 | Li et al. | |
| 7,277,978 B2 | 10/2007 | Khatami et al. | |
| 7,539,828 B2 * | 5/2009 | Lomnes | 711/163 |
| 7,549,016 B2 * | 6/2009 | Fujibayashi et al. | 711/112 |
| 7,599,941 B2 * | 10/2009 | Bahar et al. | |
| 7,603,533 B1 * | 10/2009 | Tsypliaev et al. | 711/167 |
| 2004/0199714 A1 | 10/2004 | Estakhri et al. | |
| 2005/0160221 A1 * | 7/2005 | Yamazaki et al. | 711/114 |
| 2006/0031648 A1 * | 2/2006 | Ishikawa et al. | 711/162 |
| 2006/0137013 A1 * | 6/2006 | Lok | 726/24 |
| 2007/0165457 A1 | 7/2007 | Kim | |
| 2007/0183179 A1 * | 8/2007 | Maeda et al. | 365/52 |
| 2007/0266201 A1 | 11/2007 | Estakhri et al. | |
| 2007/0266204 A1 | 11/2007 | Mizuno | |

(Continued)

FOREIGN PATENT DOCUMENTS

| | | |
|---|---|---|
| EP | 1818830 | 1/2007 |
| GB | 2407405 | 4/2005 |

OTHER PUBLICATIONS

Timothy Bisson, Scott A. Brandt, "Reducing Hybrid Disk Write Latency with Flash-Backed I/O Requests", May 2007.*
Chen et al "SmartSaver: Turning Flash Drive into a Disk Energy Saver for Mobile Computers" Low power electronics and designs, 2006. International symposium on, IEEE,PI Oct. 2006 pp. 412-417.

(Continued)

*Primary Examiner* — Kalpit Parikh
(74) *Attorney, Agent, or Firm* — Martine Penilla Group, LLP (57) ABSTRACT

A storage device coordinator intercepts a memory command issued by a host device and intended for a target storage device which is one of a plurality of storage devices, and, if the memory command is not optimal, transforms the memory command into one or more storage commands, each being associated with a respective storage device selected from the plurality of storage devices according to an optimization rule. A host device is also provided, which includes the storage device coordinator. A data storage system is also provided, which includes the storage device coordinator.

24 Claims, 4 Drawing Sheets

(56) References Cited

U.S. PATENT DOCUMENTS

2008/0134163 A1* 6/2008 Golde et al. .................. 717/168
2008/0263259 A1* 10/2008 Sadovsky et al. ............ 711/100

OTHER PUBLICATIONS

Papathanasiou et al "*Energy Efficient Prefetching and Caching*" Jun. 2006 pp. 255-268.

* cited by examiner

STORAGE DEVICE COORDINATOR AND A HOST DEVICE THAT INCLUDES THE SAME

FIELD OF THE INVENTION

The present invention generally relates to the field of non-volatile memories, and more specifically to a method for coordinately storing data in one or more storage devices, to a storage device coordinator that uses the method and to a host device that uses the storage device coordinator.

BACKGROUND

Non-volatile storage devices, such as flash memory devices, communicate with their host device (e.g., digital cameras and handheld and mobile computers and telephones) by using a communication protocol, which allows the host device and the non-volatile storage device to exchange data and various types of messages. For example, if the host wants to write data to, or read data from, a storage device, the host device communicates to the storage device a corresponding memory command (i.e., "write" command or "read" command).

With the proliferation of flash storage devices host devices have been designed to interoperate with more than one storage devices, and usually with two storage devices. A flash memory device can be categorized either as an "embedded" memory device, semi-removable memory device, or as a "removable" memory device. iNAND™ and mDOC™, for example, are embedded flash drives. High capacity Subscriber Identity Module (HCSIM) card, for example, is an example of semi-removable memory device. By "semi-removable" is meant a memory device that resides in a host device, connected to the host device via an internal slot or port, and is not accessible to a user during normal operation of the device. CompactFlash and MultiMediaCard ("MMC"), for example, are examples of removable flash memory devices. Some host devices contain an embedded flash memory device and a port to which a removable flash memory device can be connected. Embedded memory devices are used, for example in cell phones, and removable memory devices are used, for example in Personal Digital Assistants (PDAs), digital music players, and digital cameras. Some cell phones, however, can as well use a removable memory device. Embedded memory devices are typically used for storing files and data that are required for proper functioning of the host device, and sometimes also user identification information. Removable memory devices are mostly used for storing media content, such as pictures, video clips, and music.

If a host device has to store data and it uses only one memory device, the host device has no other external storage option than to store that data in that memory device. However, if the host device uses more than one memory device, storing files and data in a memory device is subject to an optimization process, especially if the memory devices differ in type, or they have different characteristics. For example, one of the memory devices may be faster or more reliable than the other, or it may have more storage capacity, and so on.

Some approaches exist, that use simultaneous writing data into, and reading data from different storage devices. For example, one approach involves increasing memory performance of flash memory devices by writing sectors simultaneously to multiple flash memory units. However, even though there may be multiple flash memory units on the same memory device, such multiple memory devices are not used by a common host device.

Figure 1:
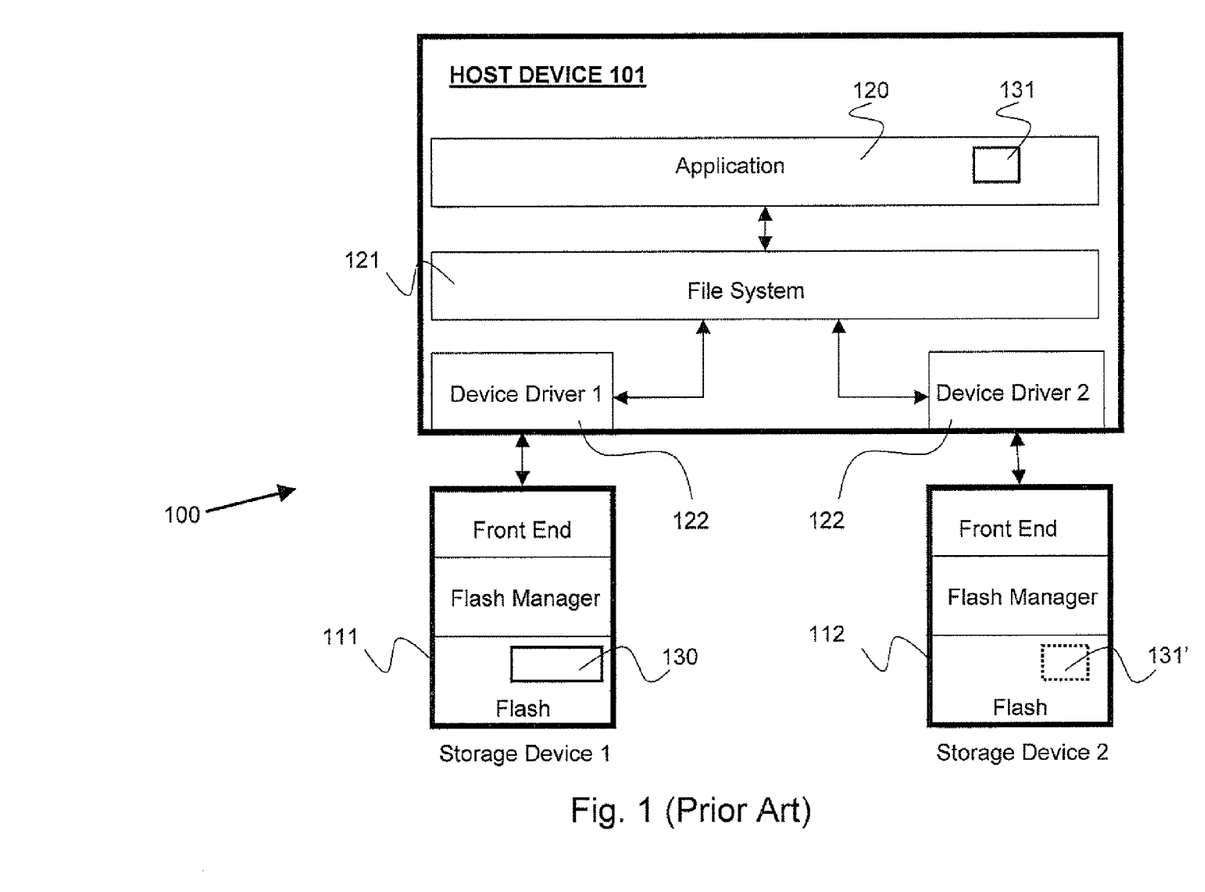
FIG. 1 (prior art) schematically illustrates a data storage system.

FIG. 1 schematically illustrates an exemplary data storage system (generally shown at 100) according to related art. Data storage system 100 includes a host device 101 and two storage devices, designated as 111 and 112. Application 120 may use file system 121 to generate and send data to, or ask for data from, any of storage devices 111. In computing systems, a file system is a method for storing and organizing computer files and the data they contain to make it easy to find and access them. In the context of FIG. 1, file system 121 writes files and data into storage devices 111 and 112 and reads files and data that are requested by application 120. Files and data are exchanged between host device 101 and any of storage devices 111 and 112 via the respective device drivers 122. Each of storage devices 111 and 112 has a flash memory (designated as "Flash") and a flash controller (designated as "Flash Managers") to manage the flash memory. Each of storage devices 111 and 112 also has an interface (designated as "Front End") for interfacing with host device 101 via the respective device driver.

Application 120 may have data for a specific storage device. Should there be such data, it will be sent to the specific storage device using file system 121. By way of example storage device 111 has stored therein data file 130, and host device 101 wants to update data file 130 with data 131. Therefore, storage device 111 is a target storage device waiting to receive data 131.

Traditionally, a file system, such as file system 121, would send data 131 to storage device 111 directly, without considering a better storage solution (that is, if such solution exists). For example, if storage device 112 is faster (i.e., it provides a faster access time) than storage device 111, it would be more system-wise efficient to send data 131 to storage device 112 first (data 131 stored in storage device 112 being designated as 131'), whereby to maintain better responsiveness of storage system 100 as a whole, and then, when it is more convenient (for example when host device 101 is in idle mode of operation), move data 131' from storage device 112 to storage device 111. However, conventional host devices such as host device 101 are not designed to make such decisions.

SUMMARY

The following embodiments and aspects thereof are described and illustrated in conjunction with systems, tools, and methods, which are meant to be exemplary and illustrative but not limiting in scope.

As part of the present disclosure a method of optimizing memory operations in a data storage system is provided, the method including intercepting, by a storage device coordinator ("SDC") a memory command originating from a host device and intended for a target storage device which is one of a plurality of storage devices in the data storage system operatively coupled to the host device; determining whether to apply an optimization rule on the memory operation command, and if so transforming, by the SDC, the memory command into one or more storage commands each being associated with a respective storage device selected from the plurality of storage devices by the SDC according to the optimization rule; and respectively applying by the SDC the one or more storage commands to the selected storage devices.

Data originating from the host device and intended for the target storage device may be routed to one or more selected storage devices selected by the SDC, and, thereafter, repatriated by the SDC to the target storage device from the selected storage devices.

As part of the present disclosure a host device is provided, which is connectable to a plurality of storage devices, the host device including a file system and a storage device coordinator (SDC) that is operative to implement the method.

As part of the present disclosure a data storage system is also provided, which includes a host device; a plurality of storage devices interfaced with the host device; and the SDC.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The claims below will be better understood by referring to the present detailed description of embodiments of the invention. This description is not intended to limit the scope of claims but instead to provide examples of the invention.

Figure 2:
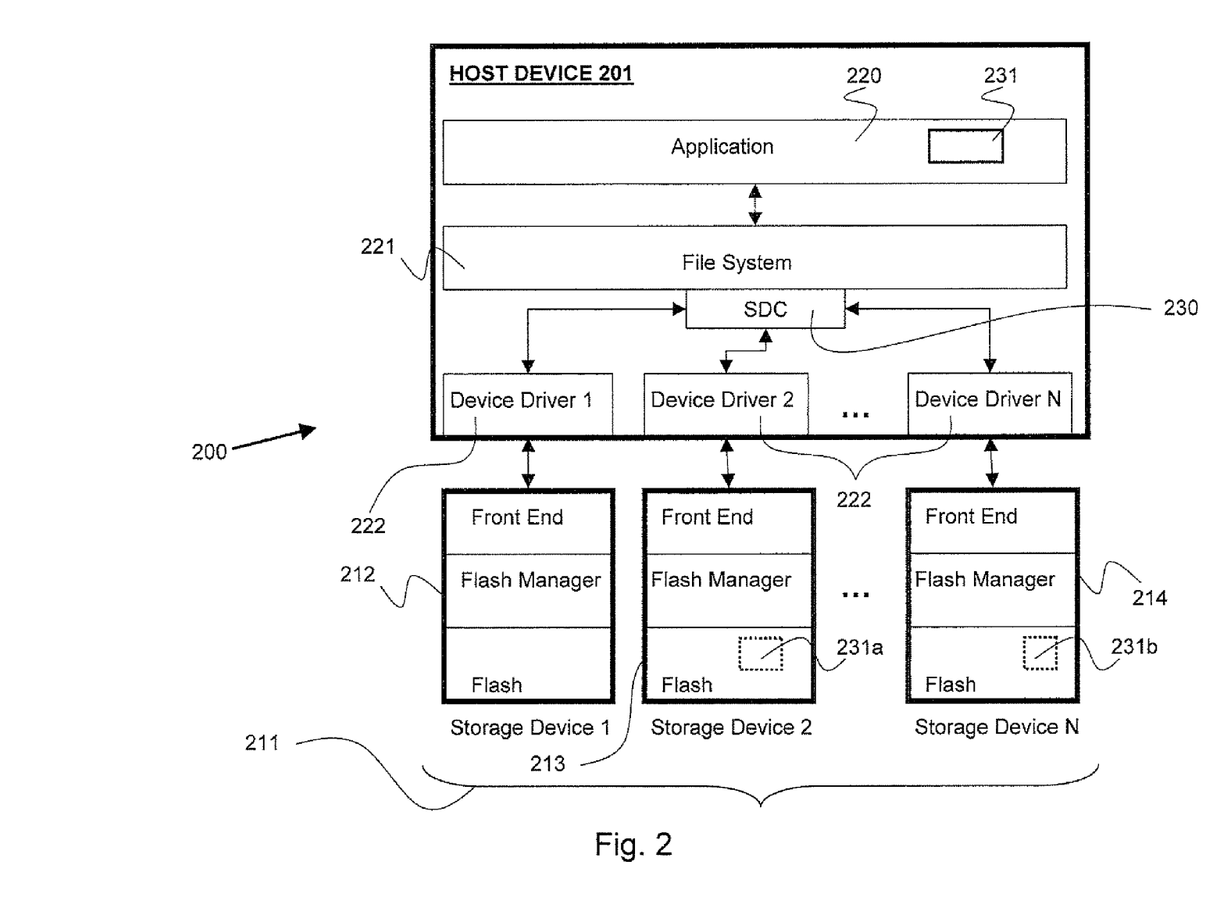
FIG. 2 schematically illustrates a data storage system according to one embodiment of the present disclosure.

FIG. 2 shows a data storage system (generally shown at 200) according to one embodiment of the present disclosure. Data storage system 200 includes a host device 201 and a plurality of storage devices 211 interfaced with host device 201. Data storage system 200 also includes a SDC that is operatively coupled to host device 201 and, via respective device driver, to the plurality of storage devices 211, Host device 201 has an application 220 that can send files and data to or asking for data from, any of storage devices 211. Host device 201 also has a File System 221 that manages the exchange of data between application 220 and storage devices 211, via the respective device driver 222. Host device 201 also has a storage device coordinator ("SDC") 230 for mitigating optimization-related deficiencies associated with the storage system configuration of FIG. 1.

Each storage device 211 has a flash memory cells array (referred to as "Flash") and a flash controller (referred to as "Flash Manager") to manage "Write", "Read" and "Erase" instructions issued by host device 201, and also to manage internal housekeeping, for example wear-leveling. Briefly, "wear-leveling" references a method for prolonging the service life of flash memories and of other kinds of erasable computer storage media. Each storage device also has an interface (designated as "Front-End") for interfacing with host device 201 via the respective device driver 222.

SDC 230 is adapted or configured to intercept a memory command originating from the host device and intended for a target storage device (e.g., storage device 212) which is one of the plurality of storage devices 211, and to determine whether to apply an optimization rule on the memory command. The term "target storage device", as used herein, is to be construed either as "target" device, or as "source" device. That is, if the memory command is an instruction to write or erase data, the storage device into which the data is to be written, or from which data is to be erased, is a "target storage device", and if the memory command is an instruction to read data from a storage device, that storage device is a "source storage device". In both cases, though, the involved storage device is referred to as "target" device because it is the target for the memory command.

If SDC 230 determines that an optimization rule should be applied on the memory command, SDC 230 transforms the memory operation command into one or more storage commands, each of which is associated with a respective storage device selected from the plurality of storage devices 211, according to an optimization rule. Then, SDC 230 respectively applies the one or more storage commands to the storage devices selected from the plurality of storage devices 211.

If application 220 wants to store data 231, which is an exemplary data, in a specific storage device 211, for example in storage device 212, host device 201 issues for storage device 212, via file system 221, a memory command in the form of write command sequence that includes, among other things, data 231 and a corresponding write instruction. However, SDC 230 is configured or adapted to intercept the write command sequence it receives from file system 221 before the write command sequence is sent out from host device 201. Once intercepted, SDC 230 checks whether writing data 231 into storage device 212 is optimal in terms of any of the context of the memory command, host device, storage devices 211, characteristics or attributes of the involved writing command, data type, file type, storage device, user experience, and so on.

If SDC 230 determines, base on an optimization rule associated with the context, characteristics, attributes, etc., that the write command sequence is optimal, SDC 230 routes the write command sequence to storage device 212 directly, without involving other storage device(s), as originally intended. However, if SDC 230 determines that the write command sequence is not optimal, SDC 230 uses a better storage solution for data 231. By "using a better storage solution" is meant selecting one or more of the plurality of storage device devices 211 in a way that, given the circumstances (e.g., characteristics of the target storage device or host device, system responsiveness, and so on) under which the command sequence was issued by host device 201, the selected one or more of the plurality of storage devices 211 providing a better responsiveness or performance, compared to the target storage device. Whether the better storage solution is optimal or not depends on the context of the intercepted memory command. That is, a given replacement storage solution may be optimal in one context but not in other contexts.

For example, host device 201 wants to send data 231 to storage device 212 but SDC 230 may determine that it would be more efficient to split data 231 into two portions and to send one portion (designated as 231a) to storage device 213 and the other portion (designated as 231b) to storage device 214, and then, when it is more convenient (for example when host device 201 is in idle mode of operation), repatriate data portion 231a and data portion 213b from storage devices 213 and 214, respectively, to storage device 212 (the target storage device). By "repatriating data" is meant sending data from one or more temporary storage devices to a target storage device; i.e., the storage device to which the data was originally intended by the host device. Other examples for better storage solutions are described below in connection with Table-1 below. One of the of storage devices 211 may have a faster access time than the others, or is more reliable than the others, so that, by using a suitable optimization rule, host device 201 can select a storage device for its faster access speed, or better reliability.

Figure 3:
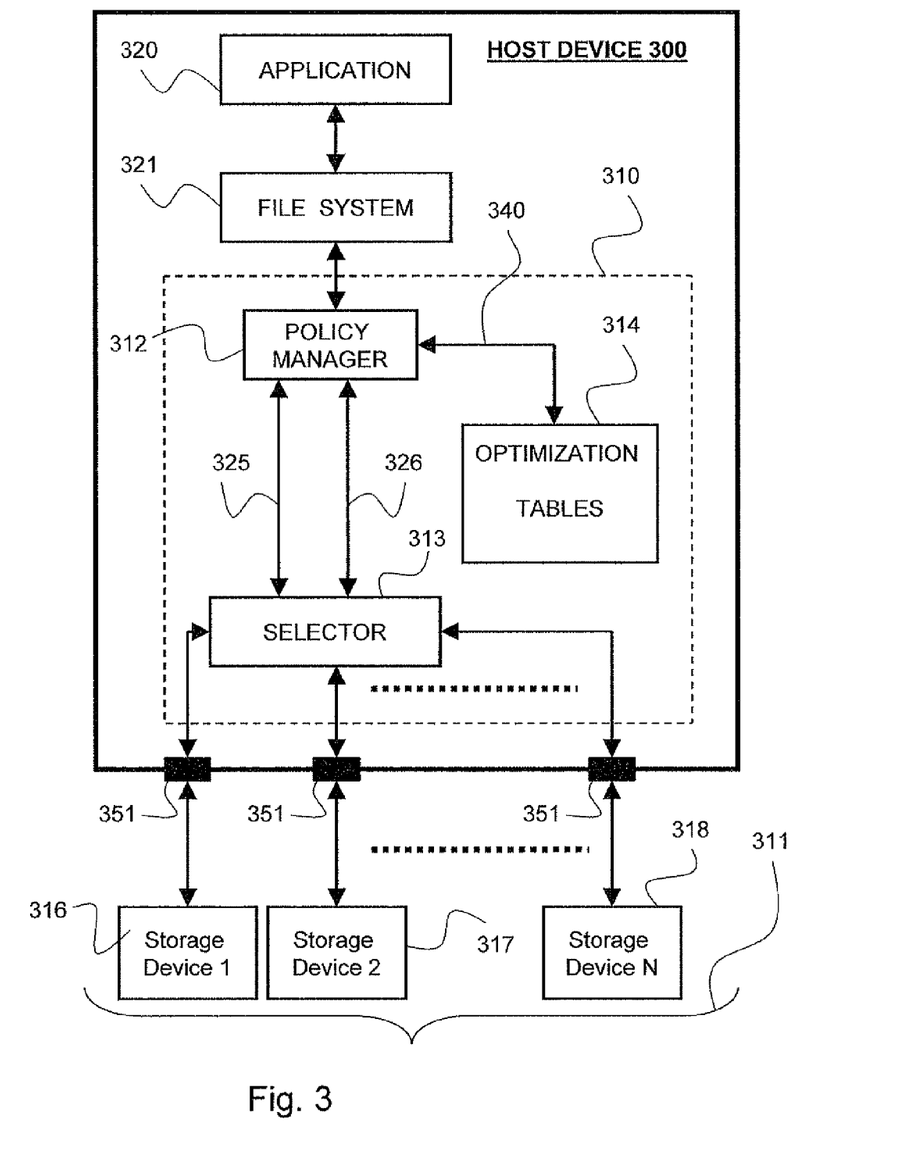
FIG. 3 shows a storage device coordinator ("SDC") according to one embodiment of the present disclosure.

The SDC may reside in the host device or in one or more of the plurality of storage devices operatively coupled to the host device. The SDC functionality may be distributed between the host device, one or more of the storage devices, and an external device that can communicate, or is in communication, with the host device. An "external device" may be, for example, a PC that has an application that can communicate with the host device. A selector similar or identical to selector 313 may reside in the host device and a policy manager similar or identical to policy manager 312 may reside in a storage device. If the selector resides in the host device and the policy manager resides in a storage device, the file system of the host device may communicate memory commands to the storage device that contains the policy manager, and the policy manager may communicate corresponding storage commands to one or more storage devices, which are selected by the policy manager, via the host device. Alternatively, the host device may send a memory command to a target storage device while the SDC resides in another storage device, in which case the target storage device will forward the memory command to the storage device containing the SDC, after which the SDC will select, based on relevant optimization rule, the one or more storage devices to which to apply transformed storage commands. It is noted that in the special cases where the SDC resides in the target storage device, the SDC intercepts the memory command after the memory command arrives at the target storage device.

Having the SDC, or some of its functionality, in a storage device may be useful, for example in cases where storage devices are operatively coupled to a host device via a common communication bus. In cases where the SDC resides in the target storage device, and depending on the type of the used communication protocol, the SDC may communicate with the other storage devices with or without a host intervention, "Common communication bus" may be provided and supported by the involved common host device. "Common communication bus" references physical bus, which facilitates direct connection between the storage devices, and logical bus and virtual bus, which facilitate indirect connection between the storage devices.

FIG. 3 schematically illustrates a host device (generally shown at 300) according to one embodiment of the present disclosure. Host device 300 may interface with a plurality of storage devices 311. Host device 300 includes a file system 321 and a storage device coordinator ("SDC") that is operatively coupled to file system 321. Application 320 uses file system 321 to exchange data with storage devices 311. SDC 310 includes a policy manager 312 and a selector 313 that is operatively coupled (shown at 325 and 326) to policy manager 312. SDC 310 may also include optimization tables such as optimization tables 314 but this is optional because optimization tables 314 may reside external to SDC 230. Optimization tables 314 include a set of optimization rules that are used (shown at 340) by policy manager 312 to determine whether one of the optimization rules should be applied to an intercepted memory command. An optimization rule associates input information with output information. Exemplary input information include, but are not limited to, characteristics or attributes of, or associated with, storage devices 311, data size constraints, file sizes and types, and so on. Exemplary output information include, but are not limited to, one or more storage devices that can be used as temporary replacement for the target storage device, and, in addition, rules that specify how, when, and in what order, the replacement one or more storage devices should be used.

Policy manager 312 intercepts a memory command originating from file system 321 of host device 300, and determines whether to apply an optimization rule on the intercepted memory command. Policy manager 312 determines whether to apply an optimization rule on the intercepted memory command based on the optimization rules held in optimization tables 314. If policy manager 312 finds an optimization rule in optimization tables 314, which is suitable, or relevant, for the intercepted memory command, policy manager 312 transforms the memory command into one or more storage commands, each being associated with a respective storage device selected from the plurality of storage devices, according to that optimization rule. Then, policy manager 312 respectively applies the one or more storage commands to the selected storage devices. The one or more storage devices selected from the plurality of storage devices 311 and the way they should be used are specified by the optimization rule.

Policy manager 312 may actually intercept a memory command from file system 321, or use past events, for example already received memory commands, to anticipate receiving a future memory command from file system 321. A past event may be stored by policy manager 312 in host 300 (e.g., in optimization tables 314) temporarily or permanently, and policy manager 312 may use various criteria (e.g., type of past event) to select between the two options. The particular optimization rule used by policy manager 312 may instruct policy manager 312 to include the target storage device in the selected one or more storage devices or to exclude it from the selected one or more storage devices.

A memory command originating from file system 321 may be a write instruction, a read instruction, or an erase instruction. If a write instruction is issued by host device 300, the memory command includes data and a "Write" instruction to write the data into the target storage device. However, as discussed above in connection with FIG. 2, writing data into a target storage device designated by the host device is not necessarily the optimal storage solution. For example, it may be desirable to write a large amount of data at a relatively high speed but the storage device designated, or assigned, by the host device for storing that data may be the slowest storage device. Policy manager 312 may find in optimization tables 314 an optimization rule that associates the data size with a faster, or the fastest, storage device among storage devices 311. For example, if host device 300 issues a memory command for storing the large amount of data in storage device 316, policy manager 312, after intercepting and scrutinizing the memory command, may find, following a check of the optimization rules held in optimization tables 314, that storage device 317 is faster than storage device 316 and, to save writing time, select storage device 317 for storing the data. Under some circumstances, for example when the data is very large, and based on a relevant optimization rule, policy manager 312 may select more than one storage device, for example storage devices 317 and 318, to store the large data.

Based on the optimization rules, policy manager 312 may determine to initially, temporarily and separately store portions of the data in the selected one or more storage devices, and, thereafter, repatriate the data portions from the selected one or more storage devices to the target storage device after a delay (e.g., after a 10-second delay). Alternatively, policy manager 312 may determine to initially store separate portions of the data in separate selected storage devices and repatriate to the target storage device only part of the data, or none. Policy manager 312 may determine to initiate background operations, for example by generating storage commands, to store different portions of the data in separate storage devices in an anticipation of a host issued read operation, to facilitate fast reading of the data when a reading instruction is issued by the host device 101 If the data is critical, policy manager 312 may decide to store a copy thereof in two or more storage devices as backup. By "background operations" is meant operations and/or storage commands that are self-initiated by the SDC to move file and data, or portions thereof, between storage devices without the data-generating application and the file system of the host device being aware of these operations and storage commands.

In order for policy manager 312 to determine whether an optimization rule should be applied to an intercepted memory command, policy manager 312 compares attributes associated, for example with the memory command to optimization rules that are held in optimization tables 314. Attributes associated with the memory command may be related to the plurality of storage devices 311, host device 300, and to the overall performance of the storage system in general. Attributes associated with the plurality of storage devices may include, but not limited to, the storage device type (i.e., SBC, MBC, etc.), wear leveling, power consumption constraints, writing speed, reading speed, data throughput, erasing speed, reliability, expected data retention, storage capacity, controller type, firmware version, number of partitions and their properties, removable memory device versus embedded memory device, and so on. "SBC" (Single Bit per Cell) references a flash memory technology in which a flash memory cell stores one logical bit. "MBC" (Multi Bit per Cell) references a flash memory technology in which a flash memory cell stores more than one logical bit.

Assuming that host device 300 has data to write into, or it has to read data from, a target storage device, policy manager 312 selects the one or more storage devices as a replacement for the target storage device, and transforms the intercepted memory command into one or more storage commands. Then, policy manager 312 forwards (shown at 325) the one or more storage commands to selector 313 along with corresponding control signals (shown at 326) that specify to selector 313 which storage command should be sent to which storage device. Then, by using the control signals sent by policy manager 312, selector 313 routes each storage command to the intended storage device.

In order for policy manager 312 to consider storage devices' attributes, each of storage devices 311 has to be registered in optimization tables 314. To that extent, policy manager 312 may execute a registration routine to register storage devices 311 in optimization tables 314. The registration routine may include or use, for example a polling application to address storage devices 311 one device at a time, and to prompt each addressed storage device to declare its attributes, which may be, or may be related to, its the type, features, capabilities, etc. Policy manager 312 may notify the host device 300 of the selected one or more storage devices. It is noted that SDC 310 may be a separate module, component, or unit in host device 300, or an integral part of file system 321. SDC 310 may reside in one of the plurality of storage devices 311. Device drivers 351 enable communication and exchange of data between host device 300 and storage devices 311.

Figure 4:
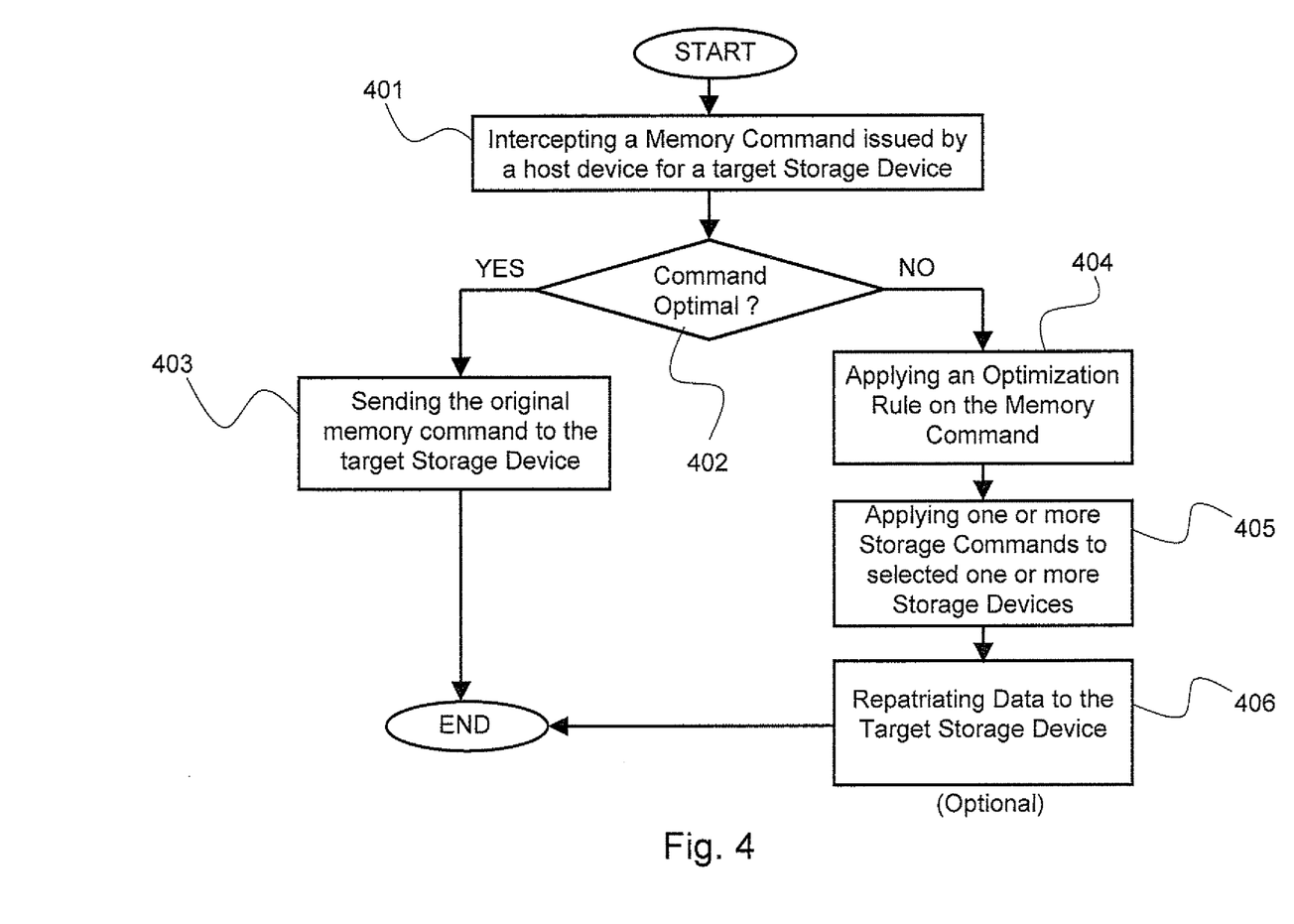
FIG. 4 shows a method for storing data in a data storage system according to one embodiment of the present disclosure.

FIG. 4 shows an exemplary method for optimizing data storage in a data storage system that includes a storage device coordinator ("SDC") and a host device that is interfaced with a plurality of storage devices. FIG. 4 will be described in association with FIG. 3. At step 401 SDC 310 intercept a memory command from file system 321, which is intended for a target storage device which is one of the plurality of storage devices 311. At step 402 policy manager 312 checks whether the memory command is optimal because if it is not optimal policy manager 312 has to apply an optimization rule on the memory command. That is, policy manager 312 checks various characteristics or attributes of, or associated with, the memory command against optimization tables 314 to determine whether to apply an optimization rule on the memory command. In other words, policy manager 312 checks whether it is better (e.g., in terms of storage device access speed, storage capacity, etc.) to handle the memory command using alternative one or more storage devices, or a combination of the genuine (i.e., the target) storage device and one or more other storage devices. If SDC 310 determines, based on the optimization rules held in optimization tables 314, that the memory command is optimal (shown as "YES" at 402), which means that no better storage solution is found, then, at step 403, SDC 310 sends the memory command to the target storage device.

If, however, SDC 310 determines that the memory command is not optimal (shown as "NO" at 402), then, at step 404, SDC 310 applies an optimization rule on the memory command based on the context of the memory command. That is, SDC 310 searches in optimization tables 314 for a corresponding optimization rule and applies it on the memory command. Applying an optimization rule on a memory command results in the transformation of the memory command into one or more storage commands, each of which is associated with a respective storage device selected from the plurality of storage devices 311. Alternatively, it may be said that SDC 310 identifies the relevant optimization rule in optimization tables 314, uses the optimization rule to select one or more replacement storage devices and transforms the memory command into one or more storage commands that are each intended for a respective replacement storage device. Then, at step 405, SDC 310 respectively applies the one or more storage commands to the selected storage devices.

If the memory command is a write instruction to write data into the target storage device, the one or more storage commands cause the data, or portions thereof, to be stored in the selected storage devices. Optionally, at step 406, SDC 310 repatriates the data, or the portions thereof, to the target storage device from the selected storage devices.

TABLE 1

| | What (received or anticipated Host-originated operation) | Multi-device configuration/ properties | Specific context information | How (as decided by a file system) | Optimized How (in the given context) |
|---|---|---|---|---|---|
| 1 | Write File F to Device X | Device X and Device Y are non-removable. Device Y is faster than Device X | User expects optimal write speed | Write directly to Device X | Write to Device Y (or concurrently to Device X and Device Y) and repatriate data to Device X in the background (before the Host is switched off) |
| 2 | Read File F from Device X | Device X and Device Y are present. Device X is removable | File F is critical for the system (e.g. boot image), or has high power failure immunity requirements. Therefore, backup is required | Read directly from Device X | Back-up File F to Device Y in anticipation, and read from either Device X or Device Y |
| 3 | Read File F from Device X | Device X and Device Y are present | User expects optimal read speed (or uses File F a lot) | Read directly from Device X | Back-up File F to Device Y in anticipation and read in parallel from Devices X and Y |
| 4 | Write File F to Device X | Device X and Device Y are non-removable. Device Y is more power-efficient than Device X | Host requires power optimization (not enough battery) | Write directly to Device X | Write to Device Y and repatriate data to Device X when Host battery is filled or when Host is switched on |
| 5 | Write File F to Device X | Device X and Device Y are present. Device X is removable, Device Y is non-removable | File G, already written onto Device X is critical (may be lost in the event Device X is unorderly removed) | Write directly to Device X | Back-up File G to Device Y in anticipation and then perform the write operation to Device X |
| 6 | Any operation to Device X | Device X and Device Y are present | Device X is entering end of life (e.g. wear level critical) | Perform operation directly on Device X | Back-up critical data from Device X to Device Y in anticipation, and perform the operation either on Device X or on Device Y |

Table-1 refers to exemplary storage solutions, each being optimized according to a specific context. In storage scenario 1, the host device wants to write file "F" to device X and storage device X and storage device Y are both embedded devices (i.e., they are non-removable devices). It is also assumed that the host device user expects to experience high write speed, for example because file F is very large, or because a certain reaction or response is expected to I occur following the writing of file F to the storage device. Assuming that storage device X is slower than storage device Y, writing file F directly to device X will be less than optimal because the host device would have to wait more time than necessary (i.e., the time it would take it to write file F into the slower storage device X) before it will be able to handle other tasks. However, by using an SDC such as SDC 310, and assuming a proper optimization rule is used, file F will be initially written into the faster storage device (i.e., into storage device Y) and later at a convenient time, the SDC will repatriate file F to storage device X. The SDC may execute background operations to repatriate file F from the faster storage device (i.e., storage device Y) to storage device X, for example before the host device is switched off.

In storage scenario 2, the host device wants to read file "F" from storage device X, storage device X is removable, and storage device Y is an embedded device. It is also assumed that file F is important for the system's operation, for example because it contains the system's boot code, or because it has high power failure immunity requirements (for which reason it is recommended that file F be backed up). In a prior art storage system the host device would only read file F from storage device X. However, using an SDC such as SDC 310, file F will be read from storage device X but backed up in storage device Y (the embedded storage device) in anticipation of the removal of removable storage device X. Having being backed up in storage device Y, file F can be read either from storage device X, or from storage device Y, or from both storage devices, whichever is more efficient.

In storage scenario 3, the host device wants to read file "F" from storage device X, storage device Y is also connected to the host device, and the user expects an optimal read speed, or uses file F extensively. In a prior art storage system the host device would read file F directly from storage device X. However, using an SDC such as SDC 310, a copy of file F will be written into storage device Y in anticipation of the "read" instruction and, upon receiving the read instruction, different parts of file F will be read in parallel from both storage devices.

In storage scenario 4, the host device wants to write file "F" to Device X, storage device X and storage device Y are both embedded devices (i.e., they are non-removable devices), storage device Y is more power-efficient than storage device X, and host device's power source (i.e., battery) weakens. In a prior art storage system the host device would write file F directly to storage device X. However, using an SDC such as SDC 310, file F will be initially written into storage device Y (i.e., the more power-efficient device), and then, after the power resource has been recharged or replenished, or when the host device has been switched on, file F will be repatriated to the intended (i.e., target) storage device; i.e., to storage device X, the less power-efficient device.

In storage scenario 5, the host device wants to write file "F" to Device X, storage device X is a removable device, storage device Y is an embedded device, file G, which is already stored in device X, is a critical file and might be lost if storage device X is not properly removed. In a prior art storage system the host device would write file F directly to storage device X. However, using an SDC such as SDC 310, file G will first be backed up in storage device Y (i.e., the non-removable device) in anticipation of the removal of storage device X, and then, file F will be written into storage device X.

In storage scenario 6, the host device performs any operation on storage device X and storage device Y is also available. In the prior art storage systems the host device would not be aware of device X beginning to wear out. Therefore, a prior art host device would perform whatever operation is there to perform directly on storage device X. However, using an SDC such as SDC 310, critical data in storage device X would be backed up in storage device Y, a less worn out storage device, in anticipation for storage device X to be unsuitable for use due to excessive wear, and the operation may be performed either on storage device X or on storage device Y.

Because of a potential risk of removing a removable storage device from the host device before a memory operation is completed, the temporary storage device (i.e., the storage device that temporarily holds data before it is repatriated to a target storage device) preferably is a non-removable storage device, for example, a High Capacity SIM card, a Flash Drive, and so on. However, in cases where the temporary storage device is a removable storage device, the host device may display to its user a message like "Memory operation is in progress—don't remove any storage media", and remove the message after the memory operation is completed.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The articles "a" and "an" are used herein to refer to one or to more than one (i.e., to at least one) of the grammatical object of the article, depending on the context. By way of example, depending on the context, "an element" can mean one element or more than one element.

The term "including" is used herein to mean, and is used interchangeably with, the phrase "including but not limited to".

The terms "or" and "and" are used herein to mean, and are used interchangeably with, the term "and/or," unless context clearly indicates otherwise.

The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. For example, the SDC and/or the optimization tables may be an integral part of the host device, for example as an integral part of the file system of the host device. The SDC or the optimization tables may be an integral part of one of the storage devices operatively coupled to the host device. The present disclosure is likewise relevant, mutates mutandis, to various types of storage devices and host devices. Accordingly, additional alternations, modifications, and improvements of the disclosed invention, though not expressly described above, are nonetheless intended and implied to be within spirit and scope of the invention.

What is claimed is:

1. A method of optimizing memory operations in a data storage system, the method comprising:
   a) intercepting, by a storage device coordinator included in a host device, a memory operation command originating from the host device and specifying a target storage device into which data is to be written, the target storage device being one of a plurality of storage devices in the data storage system that is operatively coupled to the host device, each of the plurality of storage devices being a flash memory device, the memory operation command being a write command sequence;
   b) determining whether to apply an optimization rule on the memory operation command by comparing attributes associated with the memory operation command to the optimization rule, and if not, then routing the write command sequence to the target storage device directly, and if it is determined to apply the optimization rule, then,
   c) transforming, by the storage device coordinator, the memory command into one or more storage commands each being associated with a respective storage device, which storage device being selected from the plurality of storage devices by the storage device coordinator according to the optimization rule;
   d) respectively applying by the storage device coordinator the one or more storage commands to the selected storage devices, wherein applying a storage command to a selected storage device includes handling the data, or a portion thereof by the selected storage device; and
   e) self-initiating, by the storage device coordinator, a background operation that repatriates the data, or the portion thereof, to the target storage device from the selected one or more storage devices;
   wherein determining the optimization rule to be applied to the memory command includes considering attributes associated with the plurality of storage devices, the attributes associated with the plurality of storage devices including writing speed;
   wherein the plurality of storage devices are registered by the storage device coordinator in the host device by prompting each of the plurality of storage devices to declare the attributes associated therewith;
   wherein the selected one or more storage devices include the target storage device.

2. The method according to claim 1, wherein the data to be handled is stored in two or more storage devices, the two or more storage devices excluding the target storage device.

3. The method according to claim 1, wherein the data is stored in two or more storage devices, the two or more storage devices including the target storage device.

4. The method according to claim 1, wherein the optimization rule is selected from a set of optimization rules based on the context of one or more of the memory command, target storage device, host device, and user experience.

5. The method according to claim 1, wherein one or more intercepted memory commands are used by the storage device coordinator to relocate data in the plurality of storage devices in anticipation of a future memory command.

6. The method according to claim 1, wherein determining the optimization rule to be applied to the memory command includes considering attributes associated with the memory command.

7. The method according to claim 1, wherein determining the optimization rule to be applied to the memory command includes considering attributes associated with the host device.

8. The method according to claim 1, wherein respectively applying by the storage device coordinator the one or more storage commands to the selected storage devices includes
notifying the host device, by the storage device coordinator, of the selected one or more storage devices.

9. The method according to claim 1, wherein the attributes associated with the memory operation command include one or more attributes associated with the plurality of storage devices selected from the following: bit-per-cell type, wear leveling, power consumption, data throughput, reliability, expected data retention, storage capacity.

10. The method according to claim 1, wherein the attributes associated with the plurality of storage devices include power-efficiency.

11. A host device connectable to a plurality of storage devices, the host device comprising:
a) a file system; and
b) a storage device coordinator that:
intercept a memory command originating from the file system and specifying a target storage device into which data is to be written, the target storage device being one of a plurality of storage devices that is operatively coupled to the host device, each of the plurality of storage devices being a flash memory device, the memory command being a write command sequence,
determine whether to apply an optimization rule on the memory command by comparing attributes associated with the memory command to the optimization rule, and if not, then routing the write command sequence to the target storage device directly, and if it is determined to apply the optimization rule, then,
transform the memory operation command into one or more storage commands each being associated with a respective storage device, which storage device being selected from the plurality of storage devices according to an optimization rule,
respectively apply the one or more storage commands to the selected storage devices,
wherein said memory command includes the data to be written into the target storage device,
wherein the storage device coordinator stores separate parts of the data in the selected one or more storage devices, and later self-initiates a background operation that repatriates the separate parts of the data to the target storage device;
wherein the storage device coordinator selects the optimization rule to be applied to the memory command after considering attributes associated with the plurality of storage devices, the attributes associated with the plurality of storage devices including writing speed;
wherein the storage device coordinator registers the plurality of storage devices in the host device by prompt-
ing each of the plurality of storage devices to declare the attributes associated therewith;
wherein the storage device coordinator includes the target storage device in the selected one or more storage devices.

12. The host device according to claim 11, wherein the storage device coordinator selects the optimization rule from a set of optimization rules based on the context of one or more of the memory command, target storage device, host device, and user experience.

13. The host device according to claim 11, wherein the storage device coordinator uses one or more intercepted memory commands to relocate data in the plurality of storage devices in an anticipation of a future memory command.

14. The host device according to claim 11, wherein the storage device coordinator stores said data in two or more storage devices.

15. The host device according to claim 11, wherein the storage device coordinator selects the optimization rule to be applied to the memory command after considering attributes associated with the memory command.

16. The host device according to claim 11, wherein the storage device coordinator selects the optimization rule to be applied to the memory command after considering attributes associated with the host device.

17. The host device according to claim 11, wherein the storage device coordinator notifies the host device of selected storage devices.

18. A data storage system comprising:
a) a plurality of storage devices, each of the plurality of storage devices being a flash memory device; and
b) a storage device coordinator operatively coupled to the plurality of storage devices and included in a host device;
wherein the storage device coordinator:
intercept a memory command originating from the host and specifying a target storage device into which data is to be written, the target storage device being one of the plurality of storage devices, the memory command being a write command sequence,
determine whether to apply an optimization rule on the memory command by comparing attributes associated with the memory command to the optimization rule, and if not, then routing the write command sequence to the target storage device directly, and if it is determined to apply the optimization rule, then,
transform the memory operation command into one or more storage commands each being associated with a respective storage device selected from the plurality of storage devices according to an optimization rule,
respectively applying the one or more storage commands to the selected storage devices, wherein applying a storage command to a selected storage device includes handling the data, or a portion thereof by the selected storage device, and
self-initiating a background operation that repatriates the data, or the portion thereof, to the target storage device from the selected one or more storage devices;
wherein the storage device coordinator selects the optimization rule to be applied to the memory command after considering attributes associated with the plurality of storage devices, the attributes associated with the plurality of storage devices including one or more of writing speed or power-efficiency;

wherein the plurality of storage devices are registered by the storage device coordinator in the host device by prompting each of the plurality of storage devices to declare the attributes associated therewith.

19. The data storage system according to claim 18, wherein one of the plurality of storage devices has a faster access time than the others.

20. The data storage system according to claim 18, wherein one of the plurality of storage devices is more reliable than the others.

21. The data storage system according to claim 18, wherein the host device selects a storage device for its access speed or reliability.

22. The data storage system according to claim 18, wherein the storage device coordinator resides in the host device.

23. The data storage system according to claim 18, wherein the storage device coordinator resides in one of the plurality of storage devices and is adapted to communicate with the other storage devices.

24. The data storage system according to claim 18, wherein functionalities of the storage device coordinator are distributed among one or more of the plurality of storage devices, the host device, and an external device that can communicate with the host device.

* * * * *